United States Patent
Classen

(10) Patent No.: US 10,215,772 B2
(45) Date of Patent: Feb. 26, 2019

(54) MICROMECHANICAL STRUCTURE FOR AN ACCELERATION SENSOR

(71) Applicant: Robert Bosch GmbH, Stuttgart (DE)

(72) Inventor: Johannes Classen, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 131 days.

(21) Appl. No.: 15/119,010

(22) PCT Filed: Dec. 22, 2014

(86) PCT No.: PCT/EP2014/079004
§ 371 (c)(1),
(2) Date: Aug. 15, 2016

(87) PCT Pub. No.: WO2015/120940
PCT Pub. Date: Aug. 20, 2015

(65) Prior Publication Data
US 2017/0052207 A1 Feb. 23, 2017

(30) Foreign Application Priority Data

Feb. 17, 2014 (DE) .................. 10 2014 202 819

(51) Int. Cl.
*G01P 15/125* (2006.01)
*G01P 15/08* (2006.01)

(52) U.S. Cl.
CPC .... *G01P 15/125* (2013.01); *G01P 2015/0817* (2013.01)

(58) Field of Classification Search
CPC ..... B81B 2201/0235; B81B 2203/0163; G01P 15/02; G01P 2015/0805; G01P 2015/0817;
(Continued)

(56) References Cited

U.S. PATENT DOCUMENTS 4,598,585 A * 7/1986 Boxenhorn ........ G01C 19/5719
73/504.12
5,025,346 A 6/1991 Tang et al.
(Continued)

FOREIGN PATENT DOCUMENTS

CN 102378733 A 3/2012
DE 102006032194 A1 1/2008
(Continued)

OTHER PUBLICATIONS

International Search Report dated Mar. 23, 2015, of the corresponding International Application PCT/EP2014/079004 filed Dec. 22, 2014, 2 pages.

*Primary Examiner* — Benjamin R Schmitt
(74) *Attorney, Agent, or Firm* — Norton Rose Fulbright US LLP; Gerard Messina

(57) ABSTRACT

A micromechanical structure for an acceleration sensor, including a seismic mass that is constituted definedly asymmetrically with reference to the rotational Z axis of the structure of the acceleration sensor, spring elements that are fastened on the seismic mass and on at least one fastening element, a rotational motion of the seismic mass being generatable by way of the spring elements substantially only upon an acceleration in a defined sensing direction within a plane constituted substantially orthogonally to the rotational Z axis.

15 Claims, 5 Drawing Sheets

(58) Field of Classification Search
CPC ..... G01P 2015/0854; G01P 2015/0862; G01P 15/0888
USPC .......................... 73/514.02, 514.16, 514.24
See application file for complete search history.

(56) References Cited

U.S. PATENT DOCUMENTS

| | | | | |
|---|---|---|---|---|
| 5,905,203 A * | 5/1999 | Flach | ................. | G01P 15/0802 |
| | | | | 73/514.32 |
| 2006/0191338 A1* | 8/2006 | Willig | ................. | G01C 19/5726 |
| | | | | 73/504.12 |
| 2007/0220973 A1* | 9/2007 | Acar | ................. | G01C 19/5719 |
| | | | | 73/504.12 |
| 2011/0147860 A1 | 6/2011 | Robert et al. | | |
| 2013/0152686 A1 | 6/2013 | Venkatraman | | |
| 2014/0251011 A1* | 9/2014 | Zhang | ................. | G01P 15/08 |
| | | | | 73/514.32 |

FOREIGN PATENT DOCUMENTS

| | | |
|---|---|---|
| DE | 102006059928 A1 | 8/2008 |
| DE | 102008001442 A1 | 11/2009 |
| DE | 102009026738 A1 | 12/2010 |
| DE | 102009045391 A1 | 4/2011 |
| DE | 102011011160 A1 | 7/2012 |
| DE | 102011083487 A1 | 3/2013 |
| EP | 0244581 B1 | 4/1991 |
| EP | 0773443 B1 | 5/2000 |
| EP | 1626283 A1 | 2/2006 |

* cited by examiner

MICROMECHANICAL STRUCTURE FOR AN ACCELERATION SENSOR

FIELD OF THE INVENTION

The present invention relates to a micromechanical structure for an acceleration sensor. The invention further relates to a method for manufacturing a micromechanical structure for an acceleration sensor.

BACKGROUND INFORMATION

Micromechanical acceleration sensors that are manufactured on a mass-produced basis, for example, for applications in the automotive sector or the consumer sector, are known in the existing art. In the automotive sector in particular, one of the great challenges is to design such sensors with maximum vibration robustness. For this reason, it is desirable with regard to a micromechanical acceleration sensor to implement a transfer function in which low frequencies in the region of the useful band (typical bandwidth approx. 10 to approx. 400 Hz) are transferred "smoothly," and higher frequencies due to undesired vibratory excitations are effectively suppressed.

For suppression of high deflection amplitudes, acceleration sensors are in general hermetically encapsulated in a sensor cavity having a relatively high internal pressure of several 100 mbar; higher-viscosity gases, for example neon, are often used for this. The enclosed gas ensures a high degree of damping of the micromechanical structure. The aforesaid sensors are usually over-damped, so that a resonance exaggeration also does not occur in the range of the mechanical natural frequency $f_0$ (typically several kilohertz).

The damping thus produces a mechanical low-pass behavior, but the amplitude suppression of at most 20 dB per frequency decade is relatively weak. A steeper decrease in the transfer function, of 40 dB per frequency decade, is achieved above the natural frequency. In order to increase vibration resistance it is therefore desirable to design a sensor having the lowest possible natural frequency, for example 1 kHz or even lower. In the case of a lateral acceleration sensor, however (i.e. one having sensing sensitivity parallel to a chip plane), according to the existing art there are tight limits on this effort.

These sensors can be described in simplified fashion as a spring-mass system whose deflection can be calculated in accordance with Hooke's law as:

$$m*a = k*x \quad (1)$$

m=mass
a=acceleration
k=spring constant
x=deflection.

The deflection x is obtained as:

$$x = m*a/k \quad (2)$$

or, reformulated using the natural frequency $f_0$:

$$x = a/(4*\pi^2*f_0^2) \quad (3)$$

The deflection amplitude x thus increases as the square of the decrease in resonant frequency.

A typical sensor for so-called "low-g" applications, with measurement ranges of a few g (e.g. for ESP or hill start assist), has a natural frequency of 3 kHz and deflects approximately 28 nm upon an acceleration of 1 g. With a sensor having a natural frequency of 1 kHz this value would already increase to approx. 250 nm. Because acceleration sensors even for low-g applications must have a dynamic range or overload robustness of 20 g or even 50 g (i.e. must not mechanically hit or "clip"), an acceleration sensor having a 50 g clipping acceleration would need to permit a deflection of more than 12 μm.

Typical gaps in the plate capacitor assemblages usually used between the movable and fixed electrodes of capacitive acceleration sensors are, however, only approx. 2 μm in size. Widening the gap to 12 μm would cause the sensitivity of the individual electrodes to decrease by a factor of approximately 36, since the sensitivity dC/dx has an inverse square dependence on the gap.

It would also be possible to implement considerably fewer electrodes on a given area, so that the total sensitivity would in fact decline even more sharply and the signal to noise ratio would thus be intolerably poor.

An alternative to plate electrodes is represented by so-called comb electrodes, which are known e.g. from DE 10 2006 059928 A1 and in which larger deflections are possible. The damping forces in comb electrodes are substantially smaller, however, so that it might not be possible to implement an overcritically damped sensor. In addition, the requisite large deflections present difficult challenges in terms of spring design, since the springs not only become soft in a drive direction but also undesirably lose considerable stiffness, and thus overload resistance, in the transverse directions. The constrained correlation between natural frequency and mechanical sensitivity therefore sets very stringent limits on options for lowering the resonant frequency of micromechanical lateral acceleration sensors.

Patent document EP 0 244 581 B1 and EP 0 773 443 B1 furthermore discusses Z-acceleration sensors using the seesaw principle. An advantage with Z seesaws is the fact that there is no constrained correlation between natural frequency and mechanical sensitivity. This is because the natural frequency $f_0$ of the sensor depends on the torsional stiffness $k_t$ of the springs and on the moment of inertia J of the seesaw around the rotation axis, according to the following equation:

$$f_0^2 = [1/(2*\pi)^2]*k_t/J \quad (4).$$

The mechanical sensitivity, i.e. the rotation angle α for a given acceleration a, is also defined by the torsional stiffness $k_t$ of the springs, but additionally by the mass asymmetry $\delta_m$ and by the torque resulting therefrom:

$$\delta\alpha/\delta a \approx \delta m * r_m / k_t \quad (5)$$

δα/δa=mechanical sensitivity
δm=mass asymmetry
$r_m$=distance between center of mass of the asymmetrical mass and the torsion axis
$k_t$=torsional stiffness of the springs.

The natural frequency $f_0$ can be reduced by decreasing the torsional spring stiffness $k_t$ or by increasing the total moment of inertia J of the seesaw. If the mass asymmetry δm of the sensor is also reduced, the mechanical sensitivity of the sensor can nevertheless be kept almost arbitrarily low, and therefore need not create any limitations in terms of wide latitude when designing the sensor. This principle of using a Z seesaw as a mechanical low-pass is described in DE 10 2006 032 194 A1.

Also believed to be understood are Z seesaws that function simultaneously as X and Y lateral acceleration sensors, for example as from DE 10 2008 001 442 A1 in which a so-called "single-mass oscillator" is disclosed. An advantage of these sensors is their very compact design: with only a single seismic mass and only two springs it is possible to implement a three-channel acceleration sensor that not only executes the normal rotational motion around the Y axis in the context of a Z acceleration, but also can deflect linearly in an X direction upon an X acceleration and reacts to a Y acceleration with a rotation around the Z axis.

A mass asymmetry with respect to the rotation axis is utilized for Y sensing; and, analogously to the operating principle of the Z seesaw, the mechanical sensitivity and natural frequency around the Z axis are not rigidly correlated. But the design of the conventional single-mass oscillator is not optimal if the intention is to implement only a single-channel lateral sensor, i.e. a pure Y sensor, since the structure is deflectable in all spatial directions and can therefore deliver undesired signals (crosstalk) in the context of interference accelerations in the two directions perpendicular to the useful direction, in particular with a very large overload when the structure mechanically clips or hits.

SUMMARY OF THE INVENTION

An object of the present invention is therefore to furnish an improved micromechanical structure for a lateral acceleration sensor.

The object may be achieved, according to a first aspect, with a micromechanical structure for an acceleration sensor having:
  a seismic mass that is constituted definedly asymmetrically with reference to the rotational Z axis of the structure of the acceleration sensor;
  spring elements that are fastened on the seismic mass and on at least one fastening element,
  a rotational motion of the seismic mass being generatable by way of the spring elements substantially only upon an acceleration in a defined sensing direction within the plane constituted substantially orthogonally to the rotational Z axis.

The result thereof is that upon a lateral acceleration of the micromechanical structure in a specified direction, substantially only one rotational degree of freedom around a defined rotation axis is permitted.

According to a second aspect the object is achieved with a method for manufacturing a micromechanical structure for an acceleration sensor, having the steps of:
  constituting a seismic mass having a defined asymmetry with respect to a rotational Z axis of the structure;
  constituting spring elements in such a way that the spring elements are fastened on the seismic mass and on at least one fastening element, a motion of the seismic mass being generatable by way of the spring elements substantially only upon an acceleration in a defined sensing direction within a plane constituted orthogonally to the rotational Z axis.

Refinements of the structure according to the present invention and of the method according to the present invention are the subject matter of dependent claims.

A refinement of the structure is notable for the fact that the at least one fastening element is disposed in the rotational Z axis or, in relation to lateral dimensions of the structure, close to the rotational Z axis. A wide design latitude for the micromechanical structure is thereby advantageously supported.

A further advantageous refinement of the micromechanical structure provides that four spring elements are disposed with respect to one another approximately at an angle of 90 degrees. Particularly favorable stiffness behavior of the sensor in acceleration directions that are not to be sensed can thereby be achieved.

A further advantageous refinement of the structure is notable for the fact that the asymmetry of the seismic mass is brought about by way of a first additional mass. A mechanical sensitivity of the structure can be modified in defined fashion by way of the additional mass, the additional mass advantageously modifying the moment of inertia only slightly.

A further advantageous refinement of the structure is notable for the fact that the spring elements are constituted to be tall in relation to their width. It is thereby advantageously possible, in particular, to prevent "trampoline modes" of the seismic mass, since in such modes the spring elements are loaded flexurally, and a spring thickness is a cubic factor in terms of spring stiffness.

A further embodiment of the structure provides that the spring elements have an aspect ratio of more than five. This results in favorable dimensioning for the spring elements in terms of deflection sensitivity in the direction of the rotational axis.

A favorable refinement of the micromechanical structure provides that the at least one fastening element, and fastening elements of electrodes, are disposed close to one another in relation to an area dimension of the structure.

A further favorable refinement of the structure is notable for the fact that the at least one fastening element, and fastening elements of electrodes, are spaced away from each other by less than approx. 20% in terms of the largest side dimension of the structure. This promotes favorable usability of conventional electrodes; sensor gaps that are not too large must be maintained, since the deflections in the vicinity of the rotation axis upon a rotational motion are comparatively small. In addition, an externally acting mechanical package stress on the structure can thereby advantageously be minimized.

A favorable refinement of the micromechanical structure is notable for the fact that a second additional mass is provided in addition to the seismic mass. A further result that can thereby alternatively be achieved is that the moment of inertia of the structure is increased, while sensitivity remains substantially the same.

A further advantageous refinement of the structure is characterized in that the second additional mass is constituted from a different material than the seismic mass and the additional mass.

A further embodiment of the micromechanical structure provides that the additional mass and/or the second additional mass is disposed at least in part above the seismic mass. A wide design latitude for the micromechanical structure is advantageously supported in the aforesaid manner as well.

The present invention will be described in detail below, with further features and advantages, on the basis of several Figures. All features constitute the subject matter of the invention, regardless of their respective presentation or depiction in the description or in the Figures, and regardless of their internal references in the Claims. The Figures are merely qualitative and not necessarily depicted at exact scale. In the Figures, identical or functionally identical elements are labeled with identical reference characters.

DETAILED DESCRIPTION

Figure 1:
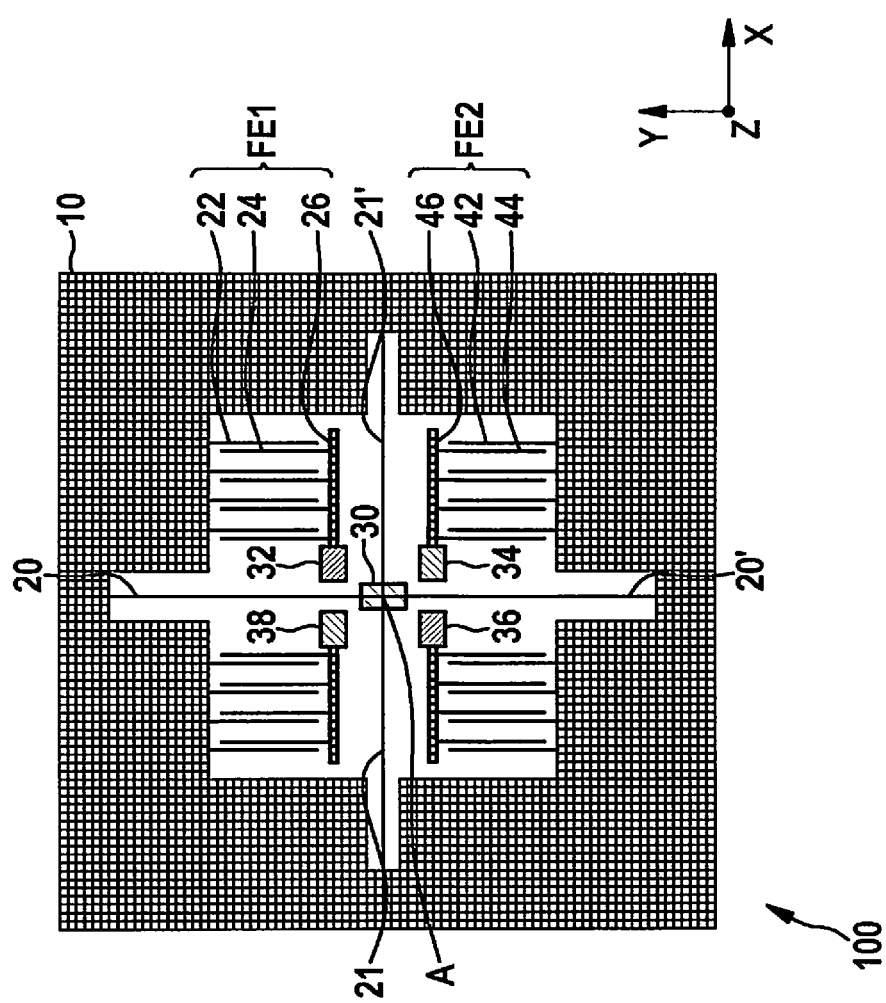
FIG. 1 shows a basic form of a micromechanical structure.

FIG. 1 shows a first micromechanical structure 100, oriented in a Cartesian coordinate system, with reference to which the basic principle of the invention can be effectively explained.

Micromechanical structure 100 is constituted substantially in a functional layer, which may be silicon, and encompasses a seismic mass 10 that is suspended by way of at least one fastening element 30, first spring elements 20, 20', and second spring elements 21, 21', in freely movable fashion above a substrate (not depicted). A rotational axis A for structure 100 can be imagined to be constituted in a Z direction through fastening element 30. In the simplest case, fastening element 30 is of integral configuration and is fastened on the substrate on a single contiguous surface at the center of structure 100. Alternatively, provision can be made to dispose fastening element 30 to the rotational Z axis A in relation to lateral dimensions of structure 100.

It is alternatively conceivable (not depicted) to use, instead of a single fastening element 30, several, which may be two or four, separate fastening elements that are fastened to the substrate with a respective lateral spacing away from rotational axis A. Spring elements 20, 20', 21, 21' may be disposed substantially orthogonally at right angles to one another, and are mounted on fastening element 30 and on seismic mass 10. Alternatively to the beam springs depicted in FIG. 1, it is also possible to use more-complex spring shapes, e.g. serpentine springs having multiple spring arms extending in substantially parallel fashion (not depicted).

Seismic mass 10 has a plurality of perforation holes that are constituted on the basis of a surface micromechanical process in which movable structures are disengaged by etching an oxide sacrificial layer beneath the silicon functional layer, the perforation holes in seismic mass 10 providing access for etching gas to regions beneath a structure to be disengaged. With other micromechanical technologies such perforation holes can be omitted.

Movable electrodes 22, opposite which are located fixed electron fingers 24 for capacitive detection of deflections, are mounted on seismic mass 10. Fixed electron fingers 24 are part of the first fixed electrodes FE1 that additionally have electrode arms 26 and an electrode suspension mount 32. A moment of inertia of micromechanical structure 100 is adjusted using the basic structure shown in FIG. 1.

Located beneath structure 100 is a conductor path plane (not depicted) with which micromechanical structure 100 can be electrically wired and impinged upon by different electrical potentials.

Figure 2:
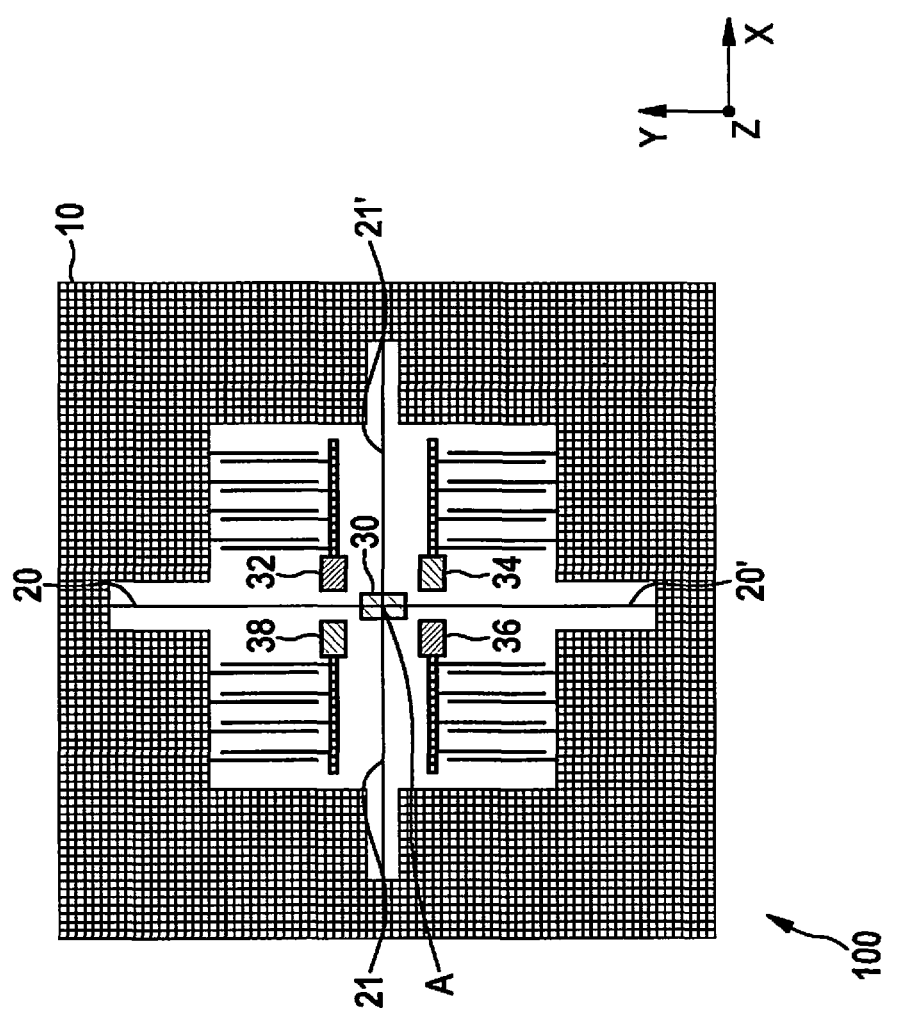
FIG. 2 shows the micromechanical structure of FIG. 1, highlighting electrical potentials of individual regions.

FIG. 2 shows the same micromechanical structure 100 as FIG. 1 but additionally indicates, by way of different cross-hatching, that first solid electrodes FE1 are at a first electrical evaluation potential and second fixed electrodes FE2 are at a second electrical evaluation potential. The movable seismic mass 10 is at a third electrical potential that is applied to fastening element 30.

Solid electrodes FE3 and FE4, which are not depicted in the interest of better clarity, are disposed analogously in the left region of structure 100.

Capacitance changes may be evaluated as difference signals of the capacitances between first solid electrodes FE1 having movable electrode fingers 22 and second solid electrodes FE2 having movable electron fingers 42.

Micromechanical structures 100 of FIGS. 1 and 2 do not represent a lateral acceleration sensor, but because of their symmetrical configurations could be used as rotational acceleration sensors to measure rotational accelerations around the Z axis. Linear accelerations in an X and Y direction, on the other hand, do not result in any appreciable deflections, since first spring elements 20, 20' are extremely stiff with respect to accelerations in a Y direction, and second spring elements 21, 21' are extremely stiff with respect to accelerations in an X direction. At least in the context of an ideally symmetrical structure 100, the result of the differential evaluation principle is that minimal residual deflections also do not result in any electrical detected signals. A linear acceleration in a Z direction does cause the mass to deflect slightly (in a so-called "trampoline" mode), but the result of the differential evaluation principle is once again that no electrical output signal occurs.

If the functional layer thickness h is also selected to be sufficiently thick, deflections in the Z direction are also already highly mechanically suppressed, specifically in inverse proportion to the square of the layer thickness h. Layer thicknesses h of approx. 20 μm and more may be particularly used. The overall result here is a micromechanical structure 100 whose mechanical sensitivity with respect to linear accelerations is very low and whose electrical sensitivity with respect to linear accelerations is equal to zero. With a suitable design of spring elements 20, 20', 21, 21' and of seismic mass 10, the rotational motion around the Z axis is the mode having by far the lowest natural frequency $f_0$. Natural frequencies $f_0$ below 1 kHz can be achieved for structure 100 by way of a sufficiently large mass 10 and with spring elements 20, 20', 21, 21' that are sufficiently rotationally soft in terms of Z rotation.

Figure 3:
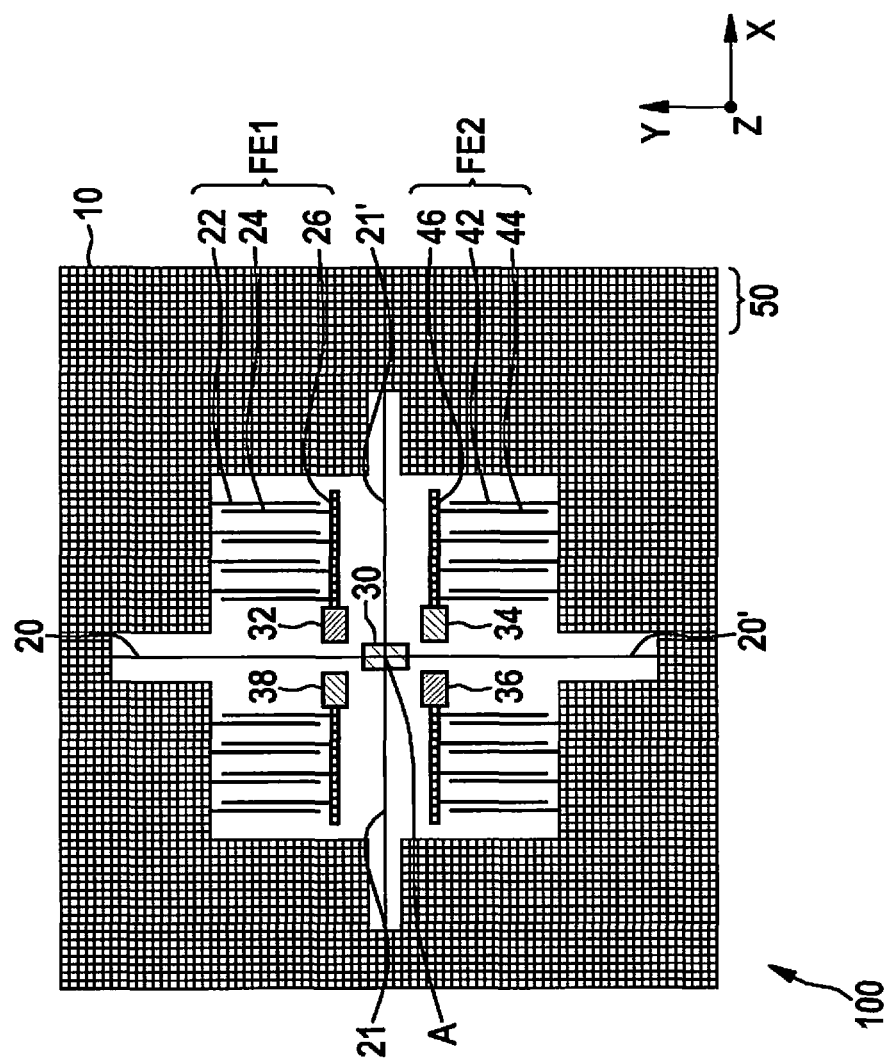
FIG. 3 shows a first embodiment of a micromechanical structure according to the present invention.

FIG. 3 shows a first embodiment of micromechanical structure 100 which differs from structures 100 of FIG. 1 and of FIG. 2 only in that a first seismic additional mass 50 has been added on the right side of the movable seismic mass 10. Additional mass 50 can be constituted integrally with seismic mass 10 and can be implemented, for example, by way of an additional layer deposition. First additional mass 50 may be dimensioned on the order of approx. 5 to 50% of the total seismic mass 10.

FIG. 3 shows first additional mass 50 emphasized with cross-hatching for illustration, although the hatching is not intended to indicate any specific electrical potential. First additional mass 50, and the asymmetry thereby generated in terms of the Z rotation axis through fastening element 30, cause micromechanical structure 100 to become sensitive with respect to accelerations in a Y direction, and to execute a rotational motion around the Z axis as a reaction to such a lateral acceleration. For this form of motion, fixed electrodes FE1, FE2 supply an electrical difference signal. Upon a clockwise rotation of mass 10, for example, the capacitance values will increase between movable fingers 22 and first solid electrodes FE1, and will decrease between movable fingers 42 and second fixed electrodes FE2.

Because second springs 21, 21' are very stiff in an X direction, linear accelerations in an X direction do not result in any appreciable deflections. Linear accelerations in a Z direction tend to generate, in addition to the trampoline-like motion mode, a rotational motion of structure 100 around the axis that is spanned by first spring elements 20, 20' and is parallel to the Y axis. In contrast to the aforementioned single-mass oscillators that have only first spring elements 20, 20', however, this rotational motion is very strongly impeded by second spring elements 21, 21'. The greater the thickness h of the functional layer of spring elements 20, 20', the more pronounced the impeding of rotational motion around the Y axis.

A mechanical sensitivity of micromechanical structure 100 in the useful Y direction, i.e. the rotation angle proportional to the applied acceleration, can be adjusted arbitrarily by way of the selection of first additional mass 50. In particular, with a small first additional mass 50 a low mechanical sensitivity along with a low natural frequency $f_0$ can be set, since the natural frequency $f_0$ is determined predominantly by the spring stiffness and the total moment of inertia J, and only to a small extent by the small first additional mass 50, while conversely the mechanical sensitivity is determined by the spring stiffness and by the torque acting via first additional mass 50.

A rough estimate has shown how greatly the rotational motion around the Y axis, and also the trampoline-like motion in a Z direction, is impeded as compared with the rotational motion around the Z axis. If the layer thickness h is considerably greater than the spring width b, the spring stiffness in terms of the rotational motion becomes dominated by second spring elements 21, 21' that are loaded flexurally. The torsional stiffness of first spring elements 20, 20', on the other hand, can be ignored for an approximate calculation. The flexural stiffness $k_{y,rot}$ of the two second spring elements 21, 21' in a Z direction, i.e. upon rotation around the Y axis, is as described below:

$$k_{y,rot} \approx 2*b*h^3/L^3 \quad (6)$$

b=width of spring elements
h=height of spring elements
L=length of spring elements.

The flexural stiffness of the four spring elements 20, 20', 21, 21' in terms of translations in a Z direction is described by the following equation:

$$k_{z,lin} \approx 4*b*h^3/L^3 \quad (7).$$

The flexural stiffness of the four spring elements 20, 20', 21, 21' in terms of rotation around the Z direction is described by the following mathematical relationship:

$$k_{z,rot} \approx 4*b^3*h/L^3 \quad (8).$$

Furthermore, the moment of inertia of structure 100 around the Z axis is on the order of twice as great as the moment of inertia around the Y axis:

$$J_z \approx 2*J_y \quad (9).$$

The ratio of the natural frequencies for the two rotational motions around the Y and the Z axis is thus stated as:

$$f_{y,rot}/f_{z,rot} \approx b/h \quad (10).$$

For widths b of the spring elements of, for example, approx. 2 μm and a layer thickness h of approx. 20 μm, the natural frequency $f_0$ of the useful mode (rotation around the Z axis) is thus lower by a factor of approximately 10 than that of the interference mode (rotation around the Y axis). The ratio of the frequency of the trampoline-like motion in a Z axis to the useful mode frequency also scales in proportion to b/h. This trampoline motion can correspondingly also be effectively suppressed by way of sufficiently narrow spring elements 20, 20', 21, 21' and large layer thicknesses.

Advantageously, with structure 100 according to the present invention it is possible to achieve a natural frequency $f_0$ of 1 kHz or less. One possibility for this is the specific dimensioning of the width b and length L of spring elements 20, 20', 21, 21', a width b of the spring elements being limited at the low end by technology. Spring widths of approx. 1 μm are achievable; production fluctuations, in particular due to variations in the width of the trenches and spring stiffness tolerances, must be taken into account specifically for extremely thin springs. The length L of spring elements 20, 20', 21, 21' is limited in principle only by the dimensions of the overall structure; where applicable, it is also possible to use serpentine spring elements that increase the effective spring length without substantially enlarging the dimensions of spring elements 20, 20', 21, 21'. The second essential parameter for achieving a low natural frequency $f_0$ is the provision of a sufficiently large seismic mass 10 or of a sufficiently large moment of inertia J. Enlarging the overall structure produces a larger mass 10, but also means increased area utilization.

Figure 4:
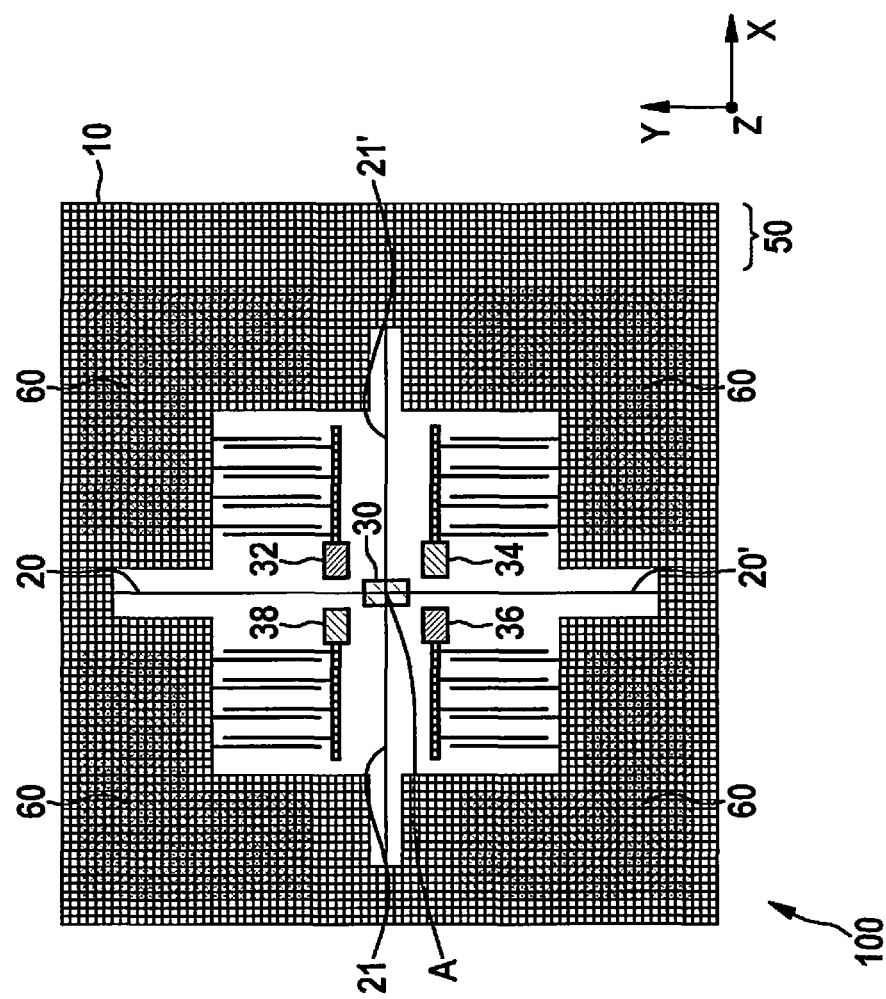
FIG. 4 shows a further embodiment of a micromechanical structure according to the present invention.

A further embodiment of structure 100 according to the present invention as shown in FIG. 4 therefore provides, alternatively to an enlargement of the overall structure, for coating at least parts of seismic mass 10 with a material 60 of high density (e.g. tungsten), and/or for filling the perforation holes partly or entirely with such a material. Corresponding technological implementations are known from DE 10 2009 026 738 A1 and DE 10 2011 011 160 A1.

Positioning of the electrodes is also essential for micromechanical structure 100 according to the present invention, since the electrical sensitivity relevant for the electrical output signal depends not only on the mechanical sensitivity but also critically on the electrode disposition, electrode area, electrode gap, and, in particular, the distance of the electrode assemblage (electrode "center of gravity") from the central anchor via fastening element 30. The electrical sensitivity can be scaled over a wide range in particular by suitable dimensioning of the distance from the rotation axis, since the shorter the distance from the rotation axis, the smaller the change in the electrode gap upon rotation around the Z axis. It is thus possible to implement a sensor that can certainly have deflections of several micrometers in an outer region far away from the rotation axis, but executes only comparatively small deflections in the region of the electrodes disposed close to rotational axis A, and thus permits utilization of standard plate electrodes.

It is evident that the electrode suspension mounts or fastening elements 32, 34, 36, 38 of the electrodes are disposed relatively close to one another in relation to fastening element 30 of seismic mass 10, which has the advantageous effect that structure 100 is highly robust with respect to substrate bending. A stress of a plastic external package of the sensor element, acting from outside on the substrate of micromechanical structure 100, can advantageously be kept low. The quality of characteristic curves of the sensor element is thereby advantageously increased.

Be it noted at this juncture that all the above-described embodiments of micromechanical structure 100 are of course to be regarded merely as examples. Other designs for spring elements 20, 20', 21, 21' that can likewise exhibit the specified behavior, i.e. easy rotatability around the Z axis and impeded rotatability with respect to the other rotation axes and to all linear directions, are conceivable. In particular, the number of spring elements is not restricted to four, although that is regarded as the better. Instead of the rectangular seismic mass 10, rounder shapes having slight mass asymmetries are of course also conceivable.

Alternative electrode dispositions are also conceivable, in particular electrodes oriented in radiating form (not depicted) with respect to the central fastening element 30, in which the rotational motion is converted into capacitance changes with even greater efficiency; or also electrodes suspended in decentralized fashion (not depicted), where each electron finger is mounted individually on the substrate; and/or so-called fully differential electrodes (not depicted), in which a finger having a first evaluation potential and a further finger having a second evaluation potential are respectively located between adjacent movable fingers. For the last-named instance the electrode dispositions according to DE 10 2009 045 391 A1, in which an additional micromechanical layer is used for cantilevered electrode suspension mounts, are to be regarded in particular as especially advantageous.

Figure 5:
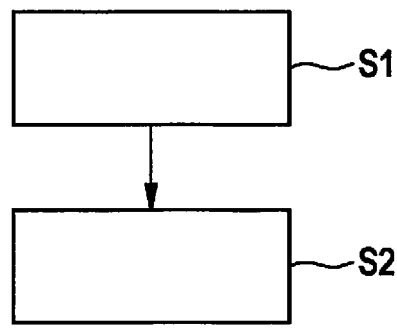
FIG. 5 schematically depicts the execution of an embodiment of the method according to the present invention.

FIG. 5 shows a schematic flow chart of an embodiment of the method according to the present invention.

In a first step S1, a seismic mass 10 having a defined asymmetry with respect to a rotational axis A of structure 100 is constituted.

In a second step S2, spring elements 20, 20', 21, 21' are constituted in such a way that spring elements 20, 20', 21, 21' are fastened on seismic mass 10 and on at least one fastening element 30, a motion of seismic mass 10 being generatable by way of spring elements 20, 20', 21, 21' substantially only upon an acceleration in a defined sensing direction within a plane constituted orthogonally to the rotational Z axis A.

Figure 6:
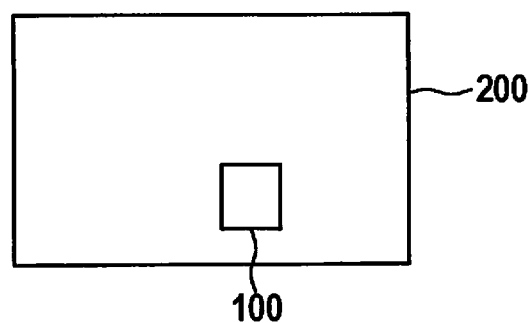
FIG. 6 is a schematic block diagram of an acceleration sensor having the micromechanical structure.

FIG. 6 schematically depicts a lateral rotational acceleration sensor 200 having a micromechanical structure 100. Acceleration sensor 200 can be used in the automotive sector for detection of a defined lateral acceleration.

In summary, what is furnished with the present invention is a lateral acceleration sensor that, upon a lateral deflection in a specified sensing direction, exhibits easy rotatability and a low transverse sensitivity transversely to the sensing direction. Thanks to the dimensioning of the spring elements in combination with a seismic mass constituted asymmetrically with respect to a rotation axis, the acceleration sensor can advantageously be constituted to be highly vibration-insensitive. It is thereby possible to implement a mechanical low-pass application that, in particular in the automotive sector, is advantageously highly insensitive to the vibrations that are often present.

The result is that with the proposed sensor principle, a lateral acceleration in one direction can be effectively detected while motions in other directions play no appreciable part in a sensing characteristic. The result is that mixing of signals is avoided, with sensing predominantly of an acceleration parallel to a chip surface, but not in a Z direction or in another lateral direction.

One skilled in the art will also implement embodiments of the micromechanical structure which are not disclosed or only partly disclosed here, without deviating from the essence of the invention.

What is claimed is:

1. A micromechanical structure for an acceleration sensor, comprising:
   a seismic mass that is constituted definedly asymmetrically with reference to the rotational Z axis of the structure of the acceleration sensor; and
   spring elements that are fastened on the seismic mass and on at least one fastening element;
   wherein a rotational motion of the seismic mass is generatable by the spring elements substantially only upon an acceleration in a defined sensing direction within a plane constituted substantially orthogonally to the rotational Z axis;
   wherein the asymmetry of the seismic mass is brought about by a first additional mass;
   wherein a second additional mass is provided in addition to the seismic mass.

2. The micromechanical structure of claim 1, wherein the at least one fastening element is disposed in the rotational Z axis or, in relation to lateral dimensions of the structure, close to the rotational Z axis.

3. The micromechanical structure of claim 1, wherein four spring elements are disposed with respect to one another approximately at an angle of 90 degrees.

4. The micromechanical structure of claim 1, wherein the spring elements are constituted to be tall in relation to their width.

5. The micromechanical structure of claim 4, wherein the spring elements have an aspect ratio of height to width of more than five.

6. The micromechanical structure of claim 1, wherein the at least one fastening element, and fastening elements of electrodes, are disposed close to one another in relation to an area dimension of the structure.

7. The micromechanical structure of claim 6, wherein the at least one fastening element, and fastening elements of electrodes, are spaced away from each other by less than approx. 20% in terms of the largest side dimension of the structure.

8. The micromechanical structure of claim 1, wherein the second additional mass is constituted from a different material than the seismic mass and the first additional mass.

9. The micromechanical structure of claim 1, wherein the first additional mass and/or the second additional mass is disposed at least in part above the seismic mass.

10. A micromechanical structure for an acceleration sensor, comprising:
    a seismic mass that is constituted definedly asymmetrically with reference to the rotational Z axis of the structure of the acceleration sensor; and
    spring elements that are fastened on the seismic mass and on at least one fastening element:
    wherein a rotational motion of the seismic mass about the rotational Z axis is generatable by the spring elements substantially only upon an acceleration in a defined sensing direction within a plane constituted substantially orthogonally to the rotational Z axis;
    wherein the rotational Z axis is orthogonal to a main extension plane of the seismic mass; and
    wherein:
        the at least one fastening element includes a fastening element situated in a central area of the seismic mass; and
        the spring elements include four spring elements disposed with respect to one another approximately at an angle of 90 degrees, each of the four spring elements connecting the seismic mass to the fastening element situated in the central area of the seismic mass.

11. The micromechanical structure of claim 10, wherein the rotational Z axis is through the fastening element situated in the central area of the seismic mass.

12. An acceleration sensor, comprising:
    a micromechanical structure, including:
        a seismic mass that is constituted definedly asymmetrically with reference to the rotational Z axis of the structure of the acceleration sensor; and spring elements that are fastened on the seismic mass and on at least one fastening element; and fixed electrodes which detect a rotation of the seismic mass;

wherein a rotational motion of the seismic mass about the rotational Z axis is generatable by the spring elements substantially only upon an acceleration in a defined sensing direction within a plane constituted substantially orthogonally to the rotational Z axis;

wherein the rotational Z axis is orthogonal to a main extension plane of the seismic mass; and wherein:
  the at least one fastening element includes a fastening element situated in a central area of the seismic mass; and
  the spring elements include four spring elements disposed with respect to one another approximately at an angle of 90 degrees, each of the four spring elements connecting the seismic mass to the fastening element situated in the central area of the seismic mass.

13. The acceleration sensor of claim 12, wherein the rotational Z axis is through the fastening element situated in the central area of the seismic mass.

14. A method for manufacturing a micromechanical structure for an acceleration sensor, the method comprising:

providing a seismic mass having a defined asymmetry with respect to a rotational Z axis of the structure; and providing spring elements so that the spring elements are fastened on the seismic mass and on at least one fastening element, so that a rotational motion of the seismic mass about the rotational Z axis is generatable by the spring elements substantially only upon an acceleration in a defined sensing direction within a plane constituted orthogonally to the rotational Z axis;

wherein the rotational Z axis is orthogonal to a main extension plane of the seismic mass;

wherein:
  the at least one fastening element includes a fastening element situated in a central area of the seismic mass; and
  the spring elements include four spring elements disposed with respect to one another approximately at an angle of 90 degrees, each of the four spring elements connecting the seismic mass to the fastening element situated in the central area of the seismic mass.

15. The method of claim 14, wherein the rotational Z axis is through the fastening element situated in the central area of the seismic mass.

* * * * *